United States Patent

[11] 3,572,444

[72] Inventors Rolland D. Scholl
  Peoria;
  Robert N. Stedman, Chillicothe, Ill.
[21] Appl. No. 819,217
[22] Filed Apr. 25, 1969
[45] Patented Mar. 30, 1971
[73] Assignee Caterpillar Tractor Co.
  Peoria, Ill.

[54] ANGLE CONTROL SYSTEM FOR ELEMENTS ON UNITIZED TRACTOR ASSEMBLIES
6 Claims, 2 Drawing Figs.

[52] U.S. Cl. .................................................. 172/4.5,
  172/803, 180/14
[51] Int. Cl. ..................................................... E02f 3/76
[50] Field of Search........................................... 172/4.5,
  803, 801; 180/6.48, 14

[56] References Cited
UNITED STATES PATENTS

| | | | | |
|---|---|---|---|---|
| RE24,175 | 7/1956 | Peterson | | 180/6.48 |
| 1,310,604 | 7/1919 | Burgess | | 180/14 |
| 2,821,179 | 2/1958 | Williams | | 172/803 |
| 3,026,638 | 3/1962 | Haynor et al. | | 172/4.5 |
| 3,454,101 | 7/1969 | Breitbarth et al. | | 172/4.5 |

Primary Examiner—Robert E. Pulfrey
Assistant Examiner—Stephen C. Pellegrino
Attorney—Fryer, Tjensvold, Feix, Phillios & Lempio ABSTRACT: Tractors connected in a side-by-side relationship to form unitized assemblies often have an adjustable, transverse earthworking element connected on opposite sides of the unitized assembly which is difficult to control due to the universal connections between the tractors. In such an assembly, an angle control system for the transverse element which maintains one end of the element at a preselected angular relationship to a manually controlled end of the element greatly enhances the productive capability. The angle control system, in combination with the unitized assembly, employs an electrolytic potentiometer as a sensor and a closed digital loop circuit to operate controls on adjusting mechanisms on one end of the transverse element to maintain a preselected angular relationship between the controlled end and its manually controlled end.

Patented March 30, 1971

INVENTORS
ROLLAND D. SCHOLL
ROBERT N. STEDMAN

BY
ATTORNEYS

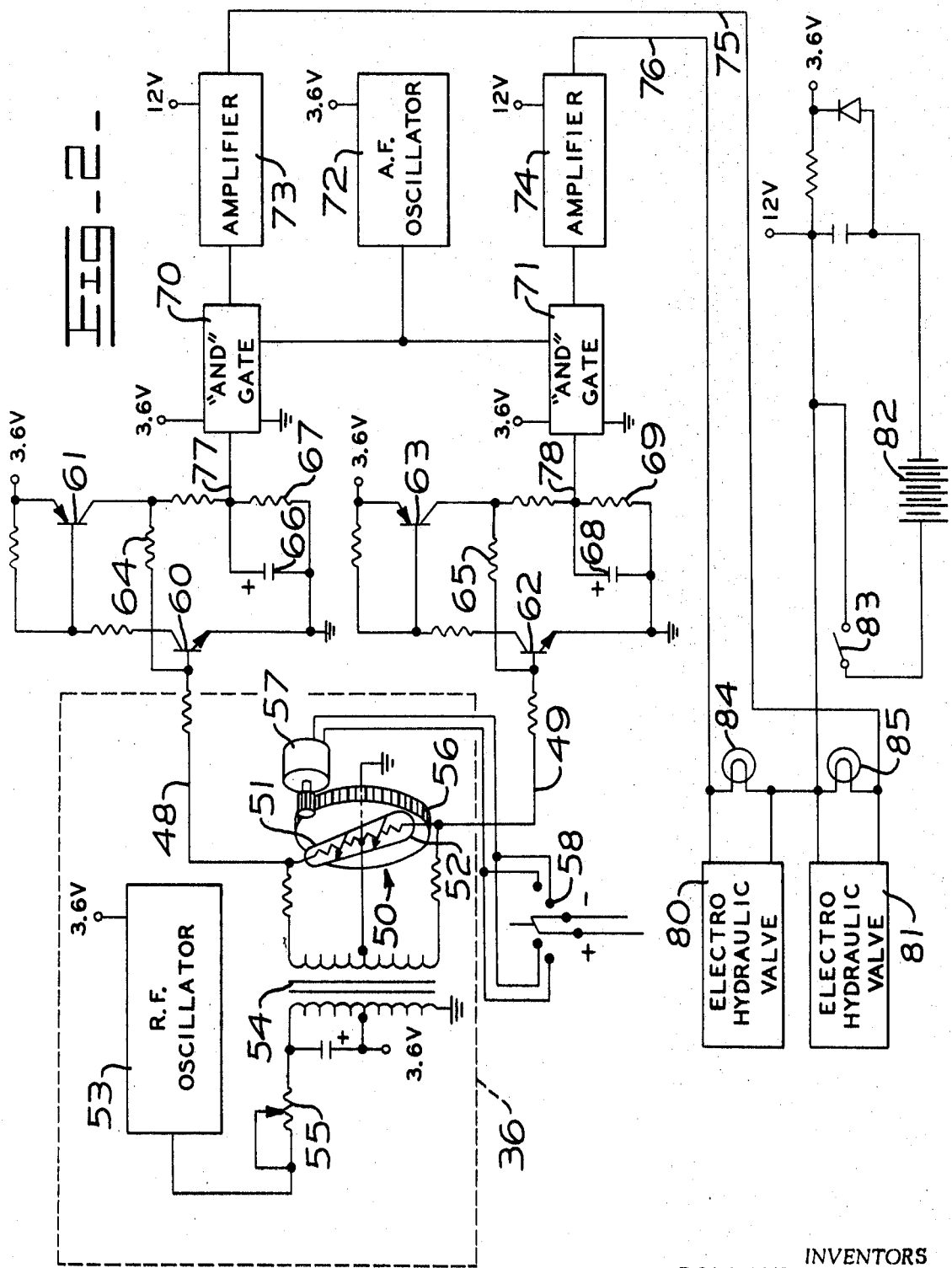

ANGLE CONTROL SYSTEM FOR ELEMENTS ON UNITIZED TRACTOR ASSEMBLIES

BACKGROUND OF THE INVENTION

In earthworking and construction projects, there is a continuing demand for vehicles with increased tractive ability and greater power to operate special earthworking implements or to undertake jobs not possible with existing equipment or effect greater economies in accomplishing such tasks. For example, in strip mining, a large volume of overburden must be moved and a large machine can effect real economies in such a specialized operation. Likewise, in land reclamation and highway construction projects, big machines with special capabilities are invaluable.

One approach to achieve increased tractive ability and greater power is to build larger tractors. However, besides being relatively expensive to construct, such large machines are difficult to transport between jobs and may exceed the load carrying capacity of many trucks, aircrafts, highway bridges, and road beds thereby limiting their usefulness. In addition, they cannot be economically employed for a variety of smaller general purpose jobs when not being employed at special projects for which they are constructed.

For the above reasons, it is desirable to combine two or more smaller tractors into an unitized assembly whereby increased tractive ability and increased power are available for operating earthworking components suitable only for larger tractors. For example, the tractors can be connected in a side-by-side relationship as disclosed in the assignee's copending Pat. application Ser. No. 635,803, entitled "Side-by-Side Tractor Combination" wherein several large tractors are unitized for operating a large earthworking blade.

When two or more tractors are unitized in a side-by-side assembly and power a single earthworking implement, such as a bulldozer blade, the operator of such a unitized assembly has extreme difficulty in controlling both ends of the large blade. Usually the operator, located on one of the tractors, is unable to clearly observe the remote end of the blade and the universal coupling of the tractors often causes the remote end of the blade to move in a somewhat unpredictable fashion when passing over uneven terrain. Thus, in order to obtain the full advantage of such an assembly, the remote end of the controllable element should be automatically slaved to a position related to the position selected by the operator for the manually controlled end of the blade.

During field tests with the instant invention, it was found that the angle control system disclosed herein worked very effectively and that it was desirable that it include an adjustment mechanism whereby the position of the controlled end relative to the manually positioned end of the element should be capable of being changed in the field. By adjustment of the angular position of the electrolytic potentiometer relative to the controlled element, it is possible to adjust the controlled end of the element relative to the manually controlled end to accommodate uneven loading on the element and necessary angle changes in the field.

Normal mass pendulum systems connected to the earthworking implement are highly unsatisfactory since material topping the blade can interfere with their free swing travel and the jerky motion of track type vehicles can effect the movement of the pendulum to the point that it becomes useless as a reference control. Further, such a pendulum system requires compensation for change in tilt of the implement. However, the extremely small mass of the fluid in the electrolytic potentiometer, accompanied by the pulse type control system on this invention, surmounts these difficulties very effectively and is less affected by changes in tilt. Its compactness and rugged solid-state design further adds to its desirability.

SUMMARY OF THE INVENTION

Exceptionally high productive capacity can be achieved by the combination of a unitized multiple side-by-side tractor assembly having a controllable element adjustably connected on opposite sides of said assembly and an angle control system for controlling one end of said controllable element in relationship to a manual positioning of its opposite end. The angle control system of the combination includes a housing mounted on the controllable element with an electrolytic potentiometer located within the housing to sense the angle error of the controllable element, and logic circuits in combination with pulsing circuits connected to the electrolytic potentiometer whereby the angle error is converted to control pulses so that the controlled end of the element is maintained at a selected angle relative to its opposite or manually positioned end. The electrolytic potentiometer may include an electrically driven means whereby its angular relationship relative to the controllable element may be changed to accommodate different angular relationships between the remote end and the manually controlled end of the element. The use of a digital system to supply pulses to the controlled end of the element eliminates the need for feedback circuits that are required in conventional analogue systems.

BRIEF DESCRIPTION OF THE DRAWINGS

FIG. 2 is a schematic diagram for the angle control system by which the remote end of the blade may be automatically maintained at a preselected angular relationship relative to the manually controlled end.

BRIEF DESCRIPTION OF AN EMBODIMENT

Figure 1:
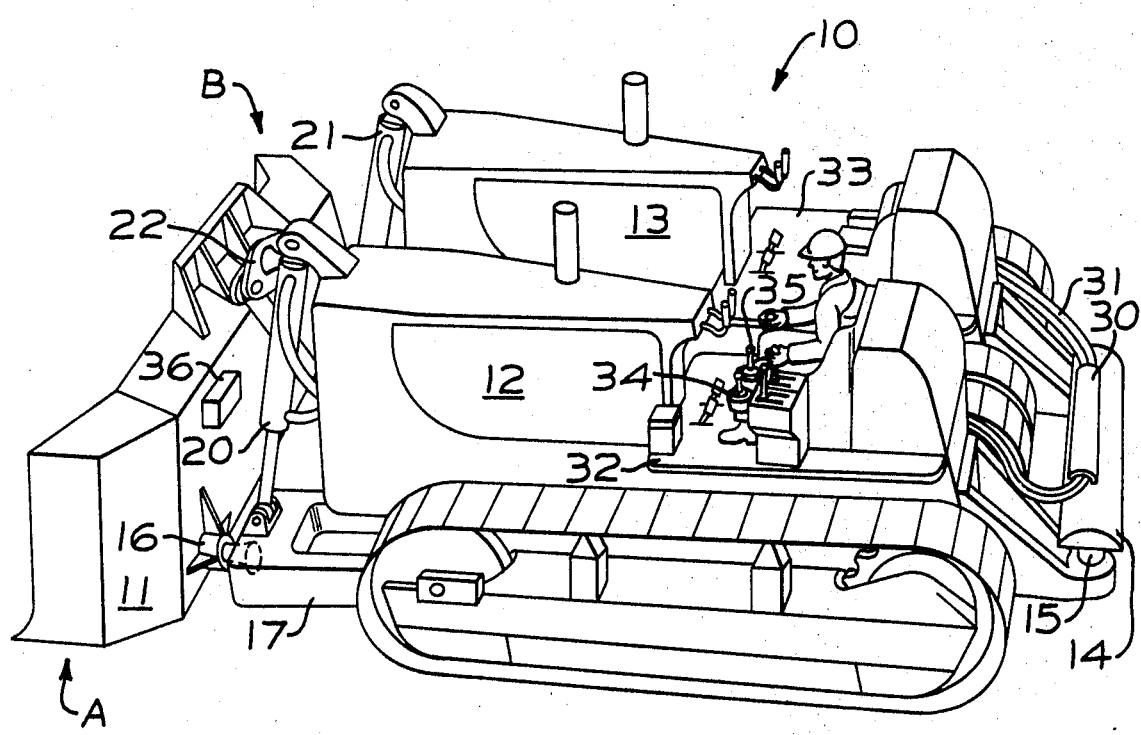
FIG. 1 is a perspective of a side-by-side tractor assembly with a bulldozer blade adjustably mounted at the front of the assembly on which the instant angle control system is employed.

Referring to FIG. 1, a unitized side-by-side tractor assembly 10 is shown with a bulldozer blade 11 (the controllable element) adjustably mounted at the front of the assembly. The assembly itself consists of two tractors 12 and 13 which are joined side-by-side in a boxlike fashion through the use of transverse beam structures and ball and socket connections. At the rear of the assembly, the two tractors are joined by a beam linkage 14 connected through a ball and socket assembly 15 protruding from the rear of each tractor. At the front of the joined tractors, the linkage is accomplished through the bulldozer blade itself, attached to the tractors through ball and socket connections 16 directly to C-frames 17 pivoted at the front of each tractor. On tractor 12, hydraulic jack 20 adjusts the C-frame up and down to control the A end of the large blade while jack 21 on tractor 13 controls the opposite or B end of the large bulldozer blade. The fore-and-aft tilt of the blade is accommodated through a central jack structure 22 located at the middle of the blade and rocks the blade about its ball and socket connections to the C-frames 17.

A greater detailed discussion of the actual connecting assemblies can be found in the assignee's copending application, Ser. No. 635,803, mentioned above and the actual construction is briefly disclosed herein merely for purposes of illustrating the unitized tractor assembly which is combined with the angle control system, more particularly discussed herein.

At the rear of the unitized assembly, a shroud 30 covers a plurality of lines 31 which connect the controls on the operator's platform 32 of tractor 12 with the controls on the operator's platform 33 of tractor 13 so that one operator can control the unitized assembly. Obviously, one of the important economies experienced by the large unitized assembly is the elimination of an operator through joint control of the severed tractors. It can be appreciated by removing the linkage beam 14 and disconnecting the bulldozer blade attachment from C-frames 17, along with removing the linkages between the two tractors (not shown), the vehicles may then be employed as separate units when convenient for a general purpose job or for transport.

In the instant application, for illustration, the A end of the blade 11 shall be identified as the manually controlled end since it is the most convenient end for the operator to observe when operating the vehicles from the operator station 32 of tractor 12. A control lever 34 on this platform serves to control the hydraulic jack 20 to raise or lower the A end of the blade. Normally, the hydraulic control valve is located closely adjacent to the pump to reduce the length of the large hydraulic lines connecting jack 20 with the pump and the control lever 34 which normally operates a pneumatic control system which shifts the hydraulic control valve to the proper or slave position. Located closely adjacent to control lever 34 is a similar control lever 35 by which jack 21 on tractor 13 can be manually controlled through an identical pneumatic system and hydraulic control valve. Normally, the position of the B end of the blade (controlled by jack 21) will be controlled by the angle control system, the bulk of which is mounted in housing 36 on the back of the blade 11, as illustrated in FIG. 1. Control switches are provided by which the operator at station 32 can switch to the angle control system or the manual control system (control lever 35) as he desires. Since the angle control system or at least its sensor, is mounted on the back of blade 11, it is not necessary for the tractors to be maintained in particular relationship for the angle control unit to function properly.

Referring now to FIG. 2, a combination block and schematic diagram for the angle control system referred to above is shown. The angle control system is enclosed within the housing 36 except for the electrohydraulic valves and the power supply for the various equipment. The sensing means may take various forms, for example, the electrolytic potentiometer 50 shown in FIG. 2. The electrolytic potentiometer is shown schematically as two resistances 51 and 52 whose value changes as the potentiometer is tilted about its central axis. The potentiometer is powered by a radio frequency oscillator 53 which is coupled to the potentiometer through a transformer 54 having a center tapped secondary. A variable resistance 55 is disposed in the coupling between the oscillator and the primary of the transformer to vary the overall sensitivity of the system.

The angle control system includes a means by which the operator may manually adjust the angle at which the angle control will maintain the blade with respect to the horizontal regardless of the movement of the A end of the blade. As explained above, this is desirable in cases where the B end of the blade strikes an obstruction which would cause the tractor to pivot about the B end of the blade. In the absence of any adjustment of the desired control angle with respect to the horizontal, the control system would maintain the blade in a fixed angular position. The only solution is the raising of the A end of the blade in which case the control system would then raise the B end of a like amount. Adjustment can be provided by mounting the potentiometer on a large spur gear 56 and providing a drive motor 57 for rotating the gear about its central axis. A switch 58 can be provided so that the operator can rotate the motor 57 in either direction to reposition the potentiometer and thus change the angle at which the blade is maintained.

The resistance 51 of the potentiometer is coupled to two stages of amplification formed by transistors 60 and 61 while the resistance 52 is coupled to two similar stages of amplification formed by transistors 62 and 63. The amplifying circuits are in effect logic circuits that convert the potentiometer signals to a control signal. The two stages of amplification include a positive feedback which is provided by a connection between the output of transistor 61 and input of transistor 60. A similar feedback is provided for transistors 62 and 63. Resistances 64 and 65 are disposed in the feedback circuits to control or limit the amount of feedback. Positive feedback is desirable to insure a quick response in the system to changes in the angular position of the blade relative to the horizontal. The two stages of amplification should each include a filter circuit, such as those formed by the capacitors 66 and 68, and the resistances 67 and 69 in order that the radio frequency may be removed from the signal and a steady state signal supplied to the remainder of the equipment.

When the blade is at the angle at which the potentiometer is set, the signals from the two resistances 51 and 52 will be substantially zero and the output from the two amplifiers will also be substantially zero. When the blade assumes an angle different than the set angle, the angle sensing means will be tilted off horizontal and one resistance will provide a more negative signal with respect to the ground while the other resistance will provide a more positive signal. Of course, the resistance that supplies a more positive signal will cause its associated amplifying stages to conduct and supply an output signal.

The amplifying stages formed by transistors 61 and 63 are coupled to AND gates 70 and 71, respectively. The AND gate 70 is indicated as being the gate which lowers the controlled or B end of the blade while the gate 71 is indicated as being the gate which raises the controlled or B end of the blade. The two AND gates are supplied with a pulse frequency from an audio frequency oscillator 72. As is well known, an AND gate requires two simultaneous positive signals in order to supply an output signal. For example, the AND gate 70 will open whenever the resistance 51 supplies a sufficiently positive signal to its associated amplifying stages to cause them to conduct. When the stages conduct the output signal from the transistor 61 will be positive and the AND gate 70 will open to pass the pulses from the oscillator 72 to the amplifier 73. Thus the AND gate 70 opens whenever the positive signal from transistor 61 and a positive pulse from oscillator 72 coincide. Similarly, if the resistance 52 is tilted so as to supply a more positive signal to its associated amplifying stages, the signal from the transistor 63 will assume an increased positive value and the AND gate 72 will open to pass the signals from the oscillator 72 to the amplifier 74. The combination of the AND gates and oscillator 72 form a pulsing circuit that converts the control signal from the amplifiers to a pulsed output.

Amplifiers 73 and 74 are conventional power amplifiers which are designed to increase the power of the signals received from the AND gates 70 and 71 to a level sufficient to operate the electrohydraulic valves 80 and 81. The amplifier 73 is coupled by means of a lead 75 to the electrohydraulic valve 81 while the amplifier 74 is coupled by a lead 76 to the electrohydraulic valve 80. The two electrohydraulic valves 80 and 81 are supplied with operating power from a suitable source, for example, a battery 82. A switch means 83 is disposed in the leads between the battery and the electrohydraulic valves and is normally located adjacent the operator of the vehicle in order that he may engage the angle control system when desired and deactivate it when he prefers to use straight manual control. Two indicating lights 84 and 85 are provided in circuit with the electrohydraulic valves in order that the operator may observe when the angle control system is raising or lowering the B end of the blade.

OPERATION OF THE PREFERRED EMBODIMENT

As explained above, the two tractors are connected in side-by-side unitized structure that permits a single operator to control both tractors. Further, the tractors are designed so that the operator will at all times manually control the jack 20 which raises or lowers the A end of the blade in front of the tractor 12 on which the operator is located. Similarly, the jack 21, which raises or lowers the B end of the blade, can be either manually controlled by the operator or automatically controlled by the angle control system described above. When the operator desires to engage the angle control system, he closes the switch 83 which supplies power not only to the electrohydraulic valves but to the remainder of the circuitry shown in FIG. 2.

When the circuit is energized it will adjust the position of the blade with respect to the horizontal so that the sensing element of the angle sensing means 50 is aligned with the horizontal. For purpose of discussion it will be assumed that it is desired to maintain the blade in a horizontal position. Providing the blade is in a horizontal position the angle sensing means 50 will supply substantially zero output signal at the two leads 48 and 49. If one assumes that the blade departs from the horizontal position then the angle sensing means 50 will no longer be aligned with the horizontal and the signal from one of the resistances will be increased while the signal from the other resistance will be decreased. For purpose of discussion it is assumed that the B end of the blade is lower with respect to the A end of the blade and thus it is necessary to raise the B end of the blade. In this case a signal on the lead 49 will assume a more positive value with respect to the reference level and cause the transistors 62 and 63 to conduct and a positive signal will appear on the lead 78. When the positive signal appears on the lead 78 the gate 71 will open whenever the positive signal coincides with one of the pulses from the oscillator 72. Thus, the output of the gate will be a series of pulses whose frequency equals the frequency of the oscillator 72. The pulses will continue to be transmitted from the gate 71 until the signal on the lead 78 falls below the threshold level of the gate 71. The pulses from the gate 71 will be amplified by the amplifier 74 and supplied to the electrohydraulic valve 80. Thus, as each pulse is supplied to the electrohydraulic valve it will cause it to open momentarily to apply additional hydraulic fluid to the jack 21 to cause the B end of the blade to rise. The above operation will continue until the blade is raised to a horizontal position. In this position the angle measuring or sensing means 50 will be aligned horizontally and no output signal will appear on the leads 48 and 49. Since no signal appears on the leads 48 and 49 there will be no positive signal supplied on the lead 77 or 78 and no pulses will be supplied to the electrohydraulic valves.

The above pulsing or digital operation has several advantages over an analogue system where one would attempt to position the electrohydraulic valves in response to the magnitude of an analogue signal. As is well known, any analogue system requires a feedback to stabilize the control and prevent overshoot as it approaches its controlled or zero position. For the digital system described above no feedback is required since the system approaches its controlled or zero position by a series of short digital steps. This of course greatly simplifies the control system and reduces the number of components required. Further, various adjusting means must be placed in feedback loops to insure stability in the system while maintaining the desired rate or speed of response.

We claim:
1. In combination with a unitized multiple side-by-side tractor assembly having a controllable element adjustably connected thereto on opposite sides of said assembly, an angle control system for one end of said controllable element comprising:
   a housing means mounted on said controllable element;
   an electrolytic potentiometer located in said housing means operable to sense the angle of said controllable element relative to a manually controlled portion thereof;
   an oscillator connected to said electrolytic potentiometer and operable to impress a signal thereon whereby an output signal proportional to an angle error sensed by said electrolytic potentiometer will be generated;
   logic circuit means connected to said potentiometer operable to convert said output signal proportional to the angle error to a control signal;
   pulsing circuits connected to receive said control signal from said logic circuit means; and
   a valve control circuit connected to receive the signal output of said pulsing circuit and operable to control a valve to raise or lower the controlled end of said controllable element through its adjustable connection with said unitized assembly in a direction to reduce the angle error sensed by said electrolytic potentiometer.
2. The combination as defined in claim 1 wherein the controllable element is a bulldozer blade.
3. The combination as defined in claim 1 wherein the housing means mounted on said controllable element can be adjusted for changes in angular relationship between the angle sensed by the electrolytic potentiometer and the elements longitudinal axis.
4. The combination as defined in claim 1 wherein the electrolytic potentiometer located in the housing means is adjustably mounted and includes drive means to change its angular relationship relative to the controllable element on which said housing is mounted.
5. The combination as defined in claim 1 wherein the pulsing circuitry includes an oscillator whose frequency is related to the desired speed for repositioning the element.
6. The combination as defined in claim 1 wherein the controllable element is connected to the assembly by hydraulic jack means through which it is adjusted relative to the unitized assembly.